United States Patent [19]

Hawkins

[11] 4,027,894
[45] June 7, 1977

[54] COUPLING HEAD FOR SECURING A VEHICLE TOWING ASSEMBLY

[76] Inventor: Wallace H. Hawkins, Rte. 7, Buncombe Road, Greenville, S.C. 29609

[22] Filed: Nov. 6, 1975

[21] Appl. No.: 629,586

[52] U.S. Cl. .............................................. 280/502
[51] Int. Cl.² ........................................... B60D 1/14
[58] Field of Search ................... 280/502; 254/78; 24/68 CT

[56] References Cited

UNITED STATES PATENTS

| | | | |
|---|---|---|---|
| 2,673,095 | 3/1954 | Fulton | 280/502 |
| 3,339,943 | 9/1967 | Hicks | 280/502 |

*Primary Examiner*—Joseph F. Peters, Jr.
*Assistant Examiner*—Michael J. Forman
*Attorney, Agent, or Firm*—Bailey, Dority & Flint

[57] ABSTRACT

A coupling head is illustrated for securing a towing assembly to the bumper of a vehicle wherein a pivoted mounting member to which a chain is fastened is provided with a locking member for securing said mounting member after it is pivoted to a chain tightening position.

3 Claims, 14 Drawing Figures

COUPLING HEAD FOR SECURING A VEHICLE TOWING ASSEMBLY

BACKGROUND OF THE INVENTION

Coupling heads for use in securing tow bars and the like on vehicle bumpers have been provided for many years. Such coupling heads are utilized to tighten and secure a chain which is attached adjacent an upper edge of a bumper to the lower edge of the bumper. The coupling heads have included a lower bumper engaging portion together with means for receiving a threaded shank which has attachment at an upper end thereof to the chain. The threaded shank is secured to the coupling head by an internally threaded nut which must be screwed, as by a wrench, tightly into engagement with the coupling head for drawing the chain tightly so as to maintain the assembly in fixed relation to the bumper. Accidents have been found to occur when such assemblies become disengaged from the vehicle bumper. The chief cause of such accidental disengagement loosening of the chain which results from the chain having become twisted between its connection to the upper edge of the bumper and the threaded shank. For example, twisting occurs most often as when the internally threaded nut engages a rough portion of the threaded shank causing twisting of the shank imparting a twist to that portion of the chain between the shank and its connection to the upper edge of the bumper. During towing on the highway, the effects of a bump on the road may result in a momentary release of the tension on the twisted portion on the chain permitting untwisting of the chain with consequent loosening of the entire assembly upon the bumper.

Accordingly, it is an important object of this invention to provide a coupling head which will not depend upon the tightening of an internally threaded member upon the threaded shank for tightening the chain.

A further object of the invention is to provide a coupling head for securing a towing assembly which may be used without the necessity of a wrench for tightening the chain.

Still another important object of the invention is the provision of a coupling head which may be manually manipulated to draw the chain tight through a pivoting action of a mounting member which will be automatically locked in position retaining the fastening chain against any tendency to loosen in normal use in a vehicle towing operation.

SUMMARY OF THE INVENTION

It has been found that a coupling head may be provided for securing the fastening chain of a vehicle towing assembly in tightened position, without imparting a twist thereto, through the use of a pivoted mounting member which provides a cam surface for automatically positioning a locking member restraining the mounting member in pivoted chain tightening position.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate a coupling head for securing a towing assembly to the bumper of a vehicle. A housing A defines an open lower bumper edge receiving groove. The housing has an opening opposite the bumper receiving groove. A mounting member B is carried by the housing for oscillation within the opening. A bumper chain C is carried for attachment on one end thereof adjacent an upper bumper edge. Means D, which include a threaded shank member, fastens the other end of the chain to the mounting member. Means E pivots the mounting member in a direction to tighten the chain, and a locking member F is operable, when the mounting member has been pivoted to a chain tightening position, to restrain the mounting member. Thus, the chain is retained in tightened untwisted position until the locking member is released.

Figure 1:
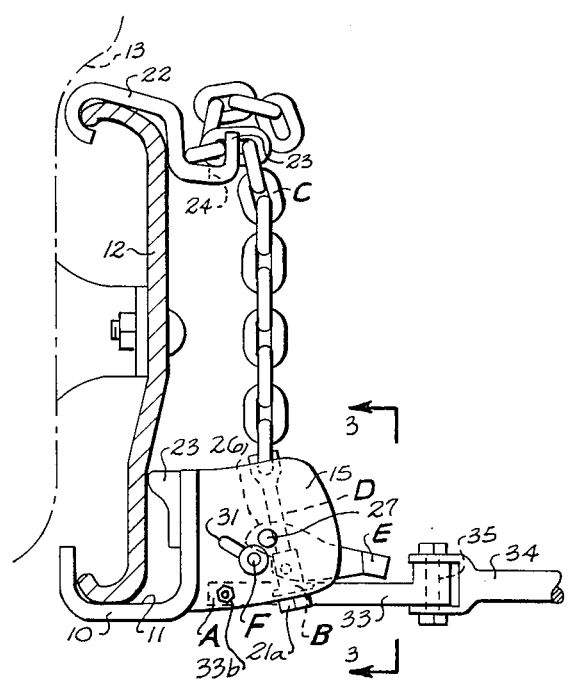
FIG. 1 is a side elevation illustrating a coupling head constructed in accordance with the present invention securing a towing assembly to the bumper of a vehicle.
Figure 2:
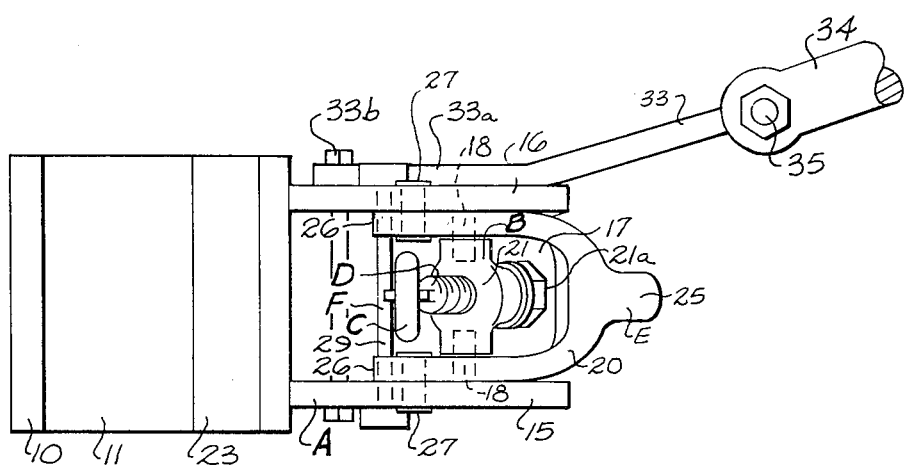
FIG. 2 is a plan view further illustrating the coupling head of FIG. 1.
Figure 3:
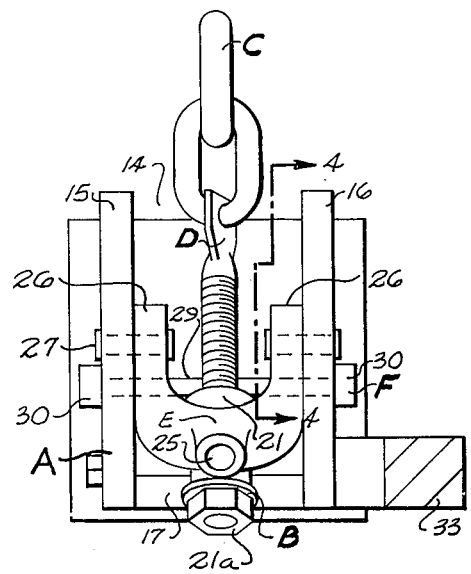
FIG. 3 is a sectional elevation taken on the line 3—3 in FIG. 1.

The housing A has a forwardly extending gripping portion 10 which defines a groove 11 for receiving a bumper 12 of the vehicle 13 (FIG. 1). The housing A has an opening 14 opposite the bumper receiving groove 11 defined by vertical flanges 15 and 16 and a base support portion 17 (FIGS. 2 and 3). A transverse mounting member B is carried by the housing for oscillation within the opening 14. The mounting member B has a stub shaft 18 extending from opposite ends thereof for pivotally connecting same to the yoke 20. Mounting member B has an enlarged internally threaded portion 21 which receives a threaded shank D to which the chain C is affixed. The lower end of the threaded shank D receives a nut 21a for securing same within the threaded portion 21. The nut 21a may be thus positioned without the aid of a wrench since it is not necessary to forcefully tighten the nut in order to pull the chain tight as was formerly required. The bumper chain C is carried for attachment on one end thereof adjacent an upper edge of the bumper 12. A U-shaped fastening 22 is provided for this purpose. The U-shaped bumper engaging portion 22 carries an upturned lower portion 23 which has the usual rectangular chain receiving slot 24 therein.

Figure 4:
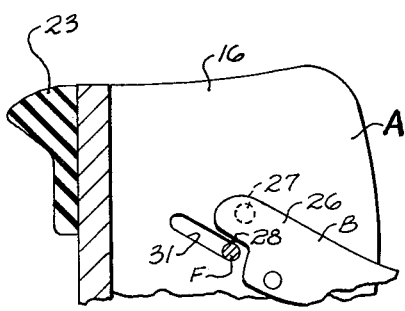
FIG. 4 is a sectional elevation taken on the line 4—4 in FIG. 3 with parts broken away.

Means E are provided for pivoting the mounting member B in a direction to tighten the chain C. The means E includes a jack handle receiving portion 25 having an opening therein for receiving a jacking member (not shown). The yoke 20, which carries the means E on one end, carries camming members 26 adjacent free ends thereof. These camming members are pivotally attached as at 27 between the vertical frame members 15 and 16. Each of these camming members have a lower camming surface 28 which normally supports a locking member F in the form of a transverse pin 29. The locking member F has enlarged retaining members 30 adjacent each end. The pin 29 rides in a rearwardly and downwardly extending slot 31. The locking member F is normally held in raised position as shown in FIG. 4 until the mounting member B is pivoted to chain-tightening position as illustrated in the drawing and this permits the locking member F to fall to the lower end of the slot 31. The locking member prevents the mounting member from pivoting upwardly thus maintaining same in chain-tightening position. The camming members 26 normally support the locking member in an upper portion of the slot 31, but when the means E is depressed the locking member F falls by gravity to the lower portion of the slot 31 beneath the camming members 26 (FIG. 4).

It will be observed that the housing A is positioned tightly with respect to a lower portion of the bumper as by the provision of a deformable material 23 carried within the groove 11. A tow bar attaching member 33 converges inwardly and carries one leg 34 of the tow bar as by a pivotal connection at 35. The attaching member 33 has a longitudinal rearward extension 33a which has pivotal connection with the housing A as at 33b.

While a preferred embodiment of the invention has been described using specific terms, such description is for illustrative purposes only, and it is to be understood that changes and variations may be made without departing from the spirit or scope of the following claims.

What is claimed is:

1. A coupling head for securing a towing assembly to the bumper of a vehicle comprising:

a housing defining an open lower bumper edge receiving groove;
a mounting member pivotally carried by said housing for oscillation opposite said bumper receiving groove;
a bumper chain carried for attachment on one end thereof adjacent an upper bumper edge;
means fastening the other end of said chain to said mounting member;
means pivoting said mounting member in a direction to tighten said chain; and
a locking member operable when said mounting member has been pivoted to a chain tightening position to restrain said mounting member;
whereby the chain is retained in tightened untwisted position until said locking member is released.

2. The structure set forth in claim 1, wherein said mounting member is pivotally carried by a yoke having pivotal connection to the housing.

3. The structure set forth in claim 2, said yoke has a camming member carried adjacent free ends thereof for normally supporting said locking member but which permits the locking member to pass therebeneath when the mounting member has been pivoted to chain tightening position.

* * * * *